J. W. PHELPS.
ELECTRICALLY HEATED COOKING APPARATUS.
APPLICATION FILED MAR. 1, 1912.

1,083,557.

Patented Jan. 6, 1914.

Witnesses
W. K. Ford
James P. Barry.

Inventor
James Wiley Phelps

By
Attys.

UNITED STATES PATENT OFFICE.

JAMES WILEY PHELPS, OF DETROIT, MICHIGAN.

ELECTRICALLY-HEATED COOKING APPARATUS.

1,083,557. Specification of Letters Patent. Patented Jan. 6, 1914.

Application filed March 1, 1912. Serial No. 680,914.

*To all whom it may concern:*

Be it known that I, JAMES WILEY PHELPS, a citizen of the United States of America, residing at Detroit, in the county of Wayne and State of Michigan, have invented certain new and useful Improvements in Electrically-Heated Cooking Apparatus, of which the following is a specification, reference being had therein to the accompanying drawings.

The invention relates to cooking apparatus and more particularly to that type known as fireless cookers and in which the heat required is generated by an electrical heating unit. Heretofore, various devices of this type have been used in which the heating unit is placed in the heat insulated chamber of the cooker, but in use such constructions have been found objectionable. The difficulty encountered is the condensation of moisture from the heated food, which in collecting on the terminals of the heating unit, may result in the short circuiting of the same, and also cause corrosion of the parts. On the other hand if the unit is placed outside of the chamber the heat generated is not used as effectively.

It is the primary object of the present invention to obtain an effective electrical heating unit which while in direct heat conducting contact with the wall of the insulated chamber, is nevertheless, outside of said chamber and is separated therefrom by a water proof joint.

Figure 1:
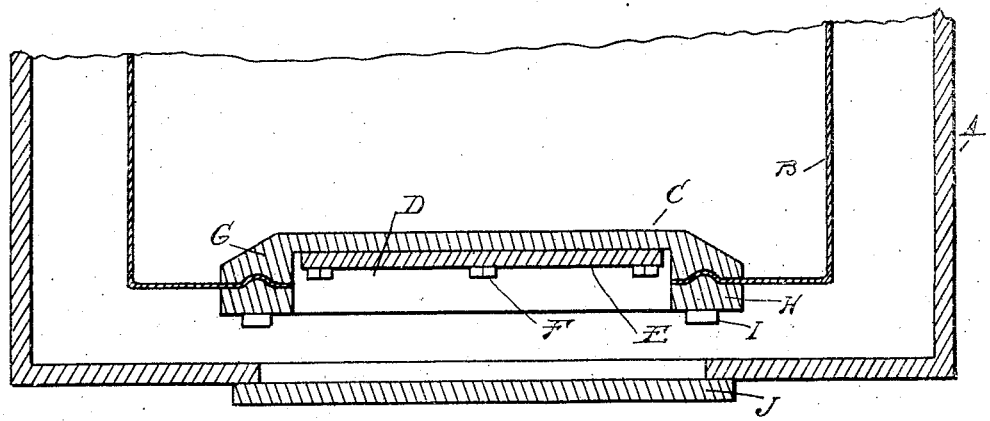
Figure 2:
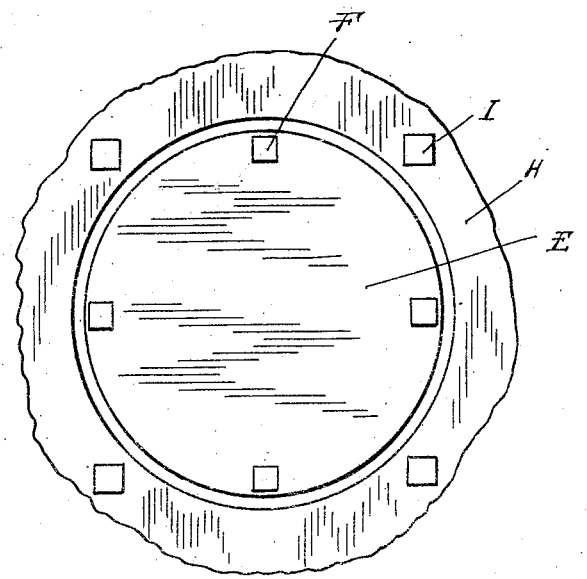

In the drawings, Figure 1 is a vertical central section through an electrically heated cooker to which my improvements are applied; Fig. 2 is a bottom plan view thereof.

A is the outer casing of a heat insulated chamber or fireless cooker and B is the inner wall or lining thereof.

C is a casing preferably of heavy gage metal forming a portion of the bottom of the receptacle B and which is provided on its under side with a recess D for receiving an electrical heating unit E, which unit may be of any suitable construction, not shown in detail, but preferably of the flat disk type, and in normal position it is secured within the recess and in heat conducting contact with the case C as by means of clamping bolts F. For attaching the case C with the lining B so as to form a water proof joint, the former is provided with a flange G against which a clamping ring H is placed with the lining B therebetween. The members G and H are also preferably provided with a bead and groove engagement which will crimp the sheet metal and form a more effective seal. Clamping screws I may be employed for securing these members together.

With the construction as shown in use, the heat developed by the unit is communicated directly to the case C and is radiated from the inner face thereof into the heating chamber. Any steam or condensation therefrom which may collect in the chamber is prevented from access to the unit as the joint between the members G and H forms a water-tight seal. For removing or replacing the unit the lining B may be withdrawn from the outer case or the bottom of said outer case may be provided with a detachable section J as shown.

What I claim as my invention is:

1. In an electric cooker, the combination with a heat-insulating chamber having a metallic lining provided with a cut-away portion, of a case or armor for said unit arranged in the cut-away portion and formed of heavy gage metal, said case forming a portion of the exposed wall of the lining of said chamber and the marginal portion of the case engaging the marginal portion of the recess and being clamped thereto and in heat-conducting contact therewith, said case being provided in the outer face thereof with a recessed portion, and an electrical heating unit arranged in said recessed portion and secured to said casing.

2. In an electric cooker, the combination with a heat-insulating chamber having a metallic lining provided with a cut-away portion, of a case or armor for said unit formed of heavy gage metal and arranged in the cut-away portion, said case forming a part of the exposed wall of the lining of said chamber and being provided in the outer face thereof with a recess, and an electrical heating unit arranged in said recess and secured to the case, the margins of the cut-away portion and the case having a water-tight beaded engagement.

3. The combination with a metallic chamber having a cut-away portion, of a case formed of heavy gage metal having the marginal portion thereof arranged within said chamber and engaging the margin of said cut-away portion, said metallic case being provided in the outer face thereof with a recess, an electrical heating unit arranged within said recess, a clamping ring encircling the margin of the cut-away portion and arranged exteriorly of the chamber, and means for clamping the margin of the cut-away portion intermediate said ring and the marginal portion of said case.

In testimony whereof I affix my signature in presence of two witnesses.

JAMES WILEY PHELPS.

Witnesses:
W. J. BELKNAP,
JAMES P. BARRY.